United States Patent
Nishina et al.

(10) Patent No.: US 7,409,276 B2
(45) Date of Patent: Aug. 5, 2008

(54) ELECTRICITY STORAGE CONTROLLER FOR VEHICLES

(75) Inventors: Mitsuhiro Nishina, Ageo (JP); Tatsuji Miyata, Ageo (JP); Masayuki Nakane, Tsurugashima (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 366 days.

(21) Appl. No.: 10/518,176

(22) PCT Filed: Mar. 31, 2003

(86) PCT No.: PCT/JP03/04113

§ 371 (c)(1),
(2), (4) Date: Aug. 23, 2005

(87) PCT Pub. No.: WO04/000600

PCT Pub. Date: Dec. 31, 2003

(65) Prior Publication Data

US 2006/0080012 A1    Apr. 13, 2006

(30) Foreign Application Priority Data

Jun. 21, 2002    (JP) .............................. 2002-181370

(51) Int. Cl.
*H02J 7/00*    (2006.01)
(52) U.S. Cl. ........................................ 701/36; 320/104
(58) Field of Classification Search .................... 701/36; 320/103–105, 116, 118–123, 132, 111, 114, 320/115, 117
See application file for complete search history.

(56) References Cited

U.S. PATENT DOCUMENTS

| | | | | |
|---|---|---|---|---|
| 5,504,415 A | * | 4/1996 | Podrazhansky et al. | 320/118 |
| 5,850,351 A | * | 12/1998 | Lotfy et al. | 700/286 |
| 5,869,950 A | * | 2/1999 | Hoffman et al. | 320/103 |
| 6,262,561 B1 | * | 7/2001 | Takahashi et al. | 320/104 |
| 6,330,455 B1 | * | 12/2001 | Ichihara | 455/522 |

FOREIGN PATENT DOCUMENTS

| | | |
|---|---|---|
| EP | 0932240 | 7/1999 |
| JP | 06-343225 | 12/1994 |
| JP | 10-084627 | 3/1998 |
| JP | 11-082258 | 3/1999 |
| JP | 11-196537 | 7/1999 |
| JP | 2000-023306 | 1/2000 |
| JP | 2001-028839 | 1/2001 |
| JP | 2002-008732 | 1/2002 |
| JP | 2002-281685 | 9/2002 |
| JP | 2003-032908 | 1/2003 |
| JP | 2003-070178 | 3/2003 |

* cited by examiner

*Primary Examiner*—Dalena Tran
(74) *Attorney, Agent, or Firm*—Rabin & Berdo, P.C.

(57) ABSTRACT

A rotary electric machine (1) which constitutes a prime bar of a vehicle and an electricity storage device (10) serving as a main power source of the rotary electric machine (1) and composed of a plurality of capacitor modules (11) in which a plurality of capacitor cells make one set are provided. A hybrid control unit (3) which comprises a means for calculating assigned voltages of the capacitor modules, a means for calculating an average value of the assigned voltages of the capacitor module, and a means for equalizing the assigned voltages of the capacitor modules based on the average value. By restricting a difference among the assigned voltages of the capacitor modules (11), it is possible to fully utilize a capacity of the electricity storage device (10).

9 Claims, 5 Drawing Sheets

_US 7,409,276 B2_

ELECTRICITY STORAGE CONTROLLER FOR VEHICLES

TECHNICAL FIELD

The present invention relates to an electricity storage controller for vehicles in which a prime bar is equipped with a rotary electric machine.

BACKGROUND ART

A technology of applying an electric double layer capacitor, in which quick charge is possible and a charge-and-discharge cycle life is long, as an electricity storage device for an electric motor coach, such as a hybrid vehicle, has attracted attention.

In order to constitute an electricity storage device having a required capacity, each capacitor module is formed by connecting a plurality of capacitor cells in series and a plurality of the capacitor modules are connected with each other in a row or in series.

In JP06-343225A which is a Japanese Patent Laid-Open Publication, an electricity storage device in which in order to adjust assigned voltages of such capacitors, a terminal voltage of each capacitor is compared with a stipulated voltage previously set and when the terminal voltage reaches the stipulated voltage, a bypass circuit for bypassing the capacitor is closed so as to avoid a further charge is disclosed, and it is well known.

In this case, however, when the speed of a vehicle is reduced or the like, energy is regenerated, more specifically, a rotary electric machine is caused to generate electricity as an electric generator and the capacitor is charged with the electric power generated. Then, if the electric power regenerated is little, there will sometimes be the case that a difference of the voltages among the capacitors is not solved indefinitely.

In this case, it is required to periodically carry out charging processes in which the assigned voltages of a capacitor cell are equalized (initialized) with a limit value. Also, external charging equipment is required and charging time is required before the vehicle is driven. This is a disadvantage which can be anticipated.

The present invention is directed to solve such problems.

More specifically, an advantage of the present invention is to restrain a difference of assigned voltages among respective capacitors by controlling charge and discharge of the capacitors based on an average value of the voltages among the capacitors.

DISCLOSURE OF THE INVENTION

An electricity storage controller for vehicles according to the present invention comprises, a rotary electric machine which constitutes a prime mover of a vehicle, an electricity storage device serving as a main power source of the rotary electric machine and composed of a plurality of capacitor modules in which a plurality of capacitor cells, a means for calculating assigned voltages each of the capacitor module, a means for calculating an average value of the assigned voltages of the capacitor modules, and a means for equalizing the assigned voltages of the capacitor modules based on the average value.

Therefore, according to the present invention, assigned voltages in units of the capacitor modules are calculated, an average voltage of these assigned voltages is calculated from these, and a difference among the assigned voltages of the capacitor modules is modified by equalization based on the average voltage. Thus, electricity is equally stored in the capacitor modules as much as possible whether the voltages are high or low, it is possible to cause all the capacitors to equally function, and the capacity (storage capacity) of the electricity storage device can fully be utilized.

BEST MODE FOR CARRYING OUT THE INVENTION

Figure 1:
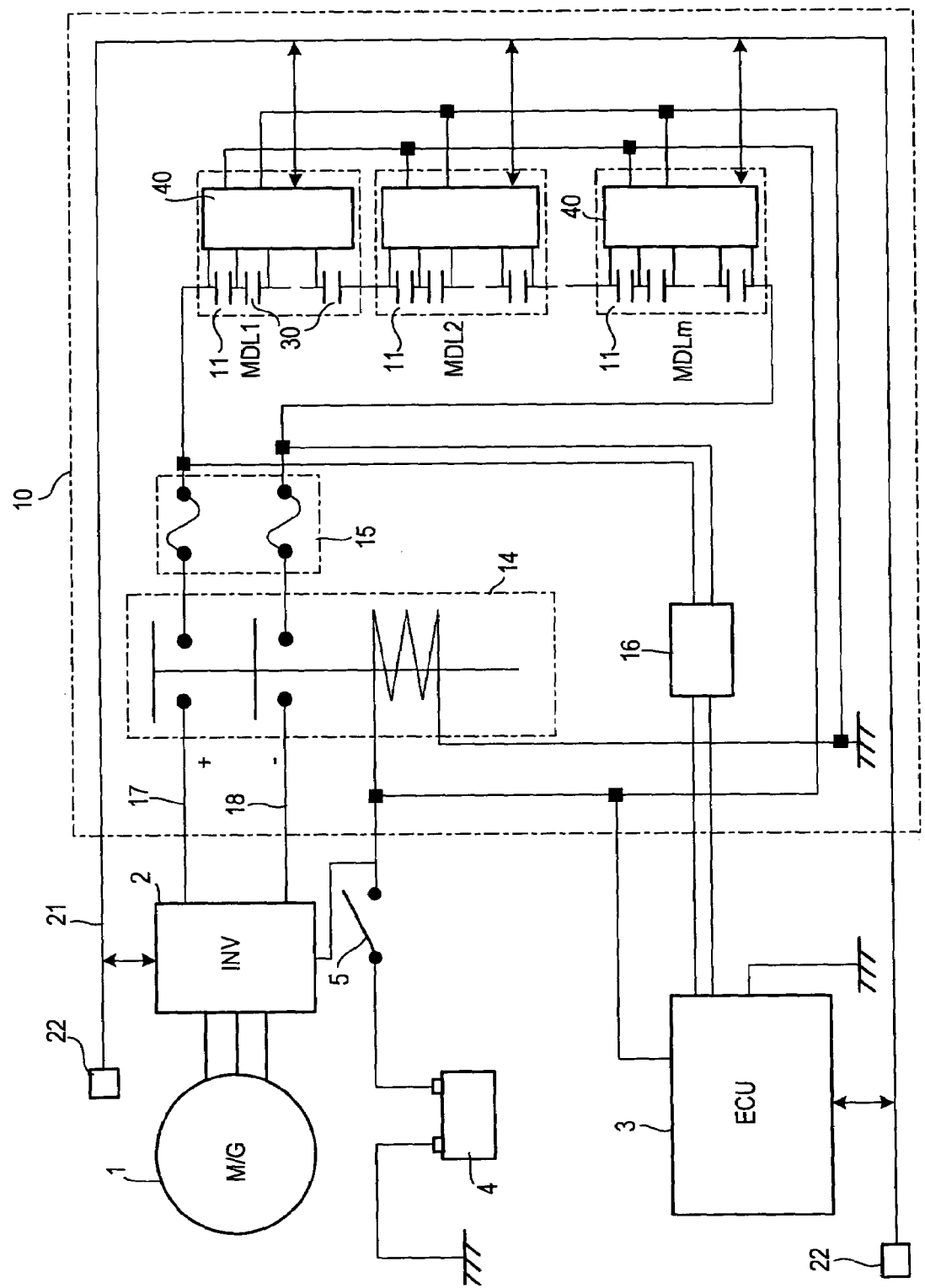
FIG. 1 is a block diagram of a system showing an embodiment of the present invention.

In FIG. 1, reference numeral 1 represents a rotary electric machine (motor generator) which constitutes a prime bar of a vehicle, and a permanent magnet type synchronous motor (IPM synchronous motor) is adopted in consideration of high efficiency, miniaturization, and weight saving. Reference numeral 10 represents an electricity storage device, and the rotary electric machine 1 is connected with the electricity storage device 10 via an inverter 2.

In response to a demand of a hybrid ECU 3, the inverter 2 controls the rotary electric machine 1 to be in an electromotive (driving) mode or in a power generation mode. In the electromotive mode, storage electric power (direct-current electric power) of the electricity storage device 10 is converted into alternate-current electric power, and the alternate-current electric power is supplied to the rotary electric machine 1 so as to drive the rotary electric machine 1. On the other hand, in the power generation mode, electric power (alternate-current electric power) generated by the rotary electric machine 1 is converted into direct-current electric power so as to charge the electricity storage device 10.

The electricity storage device 10 constitutes a power source of the rotary electric machine 1 and comprises a plurality of capacitor modules 11 (MDL1-MDLm) which are connected in series, a main circuit break conductor (relay circuit) 14, a main circuit fuse 15, a total voltage detecting amplifier 16, a main circuit power source line (+) 17, and a main circuit power source line (−) 18.

The capacitor module 11 is composed of a plurality of capacitor cells 30 which are connected in series and a control circuit board 40 for controlling quantity of these storage electricity. The plurality of capacitor modules 11 and the plurality of capacitor cells 30 are not restricted to the series connection shown in the drawing. It is justifiable that parallel connection is used together with the series connection (see FIG. 5).

The main circuit break conductor 14 closes a main circuit from the plurality of the capacitor modules 11 to the inverter 2 when coils are excited. On the other hand, the main circuit break conductor 14 opens the main circuit when the coils are demagnetized. The total voltage detecting amplifier 16 detects, in a state of insulation from the main circuit, voltages which extend over both ends of the plurality of capacitor modules 11. The detection signal is outputted to the hybrid ECU 3.

Reference numeral 4 represents an electrical installation system power source (battery). The electrical installation system power source closes the main circuit break conductor 14 by putting a key switch 5 and supplies electric power to respective electrical components (including the hybrid ECU 3, the inverter 2, and the control circuit board 40).

The hybrid ECU 3 controls the entire system. In order to exchange all kinds of information (detection data, control commands, and the like) between the hybrid ECU 3 and the inverter 2 of the rotary electric machine 1 and between the hybrid ECU 3 and the control circuit board 40 of each module 11, a communication network 21 (CAN communication) is formed. Reference numeral 22 represents terminal resistance of the communication network 21.

Figure 5:
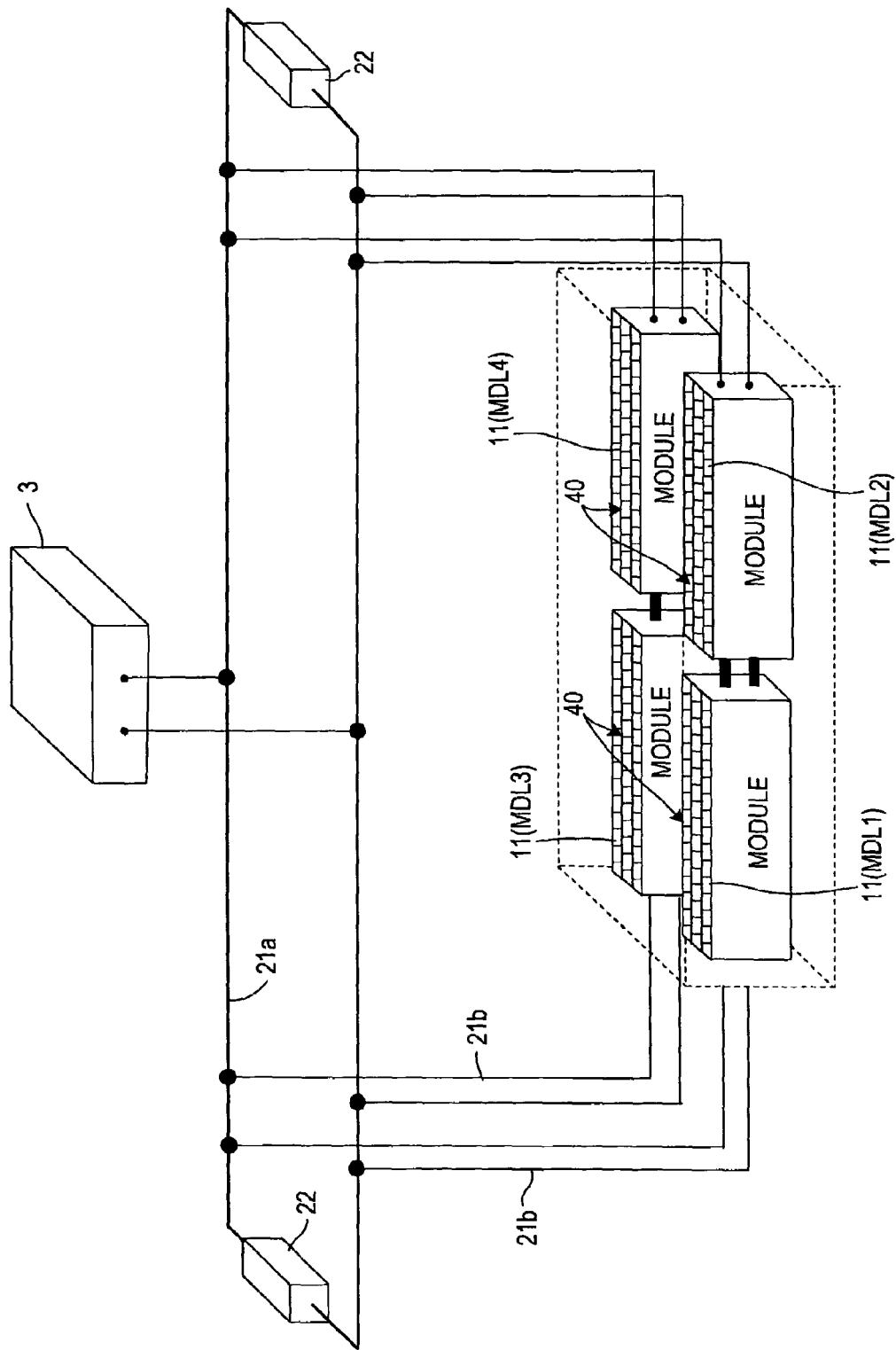
FIG. 5 is a pattern diagram of a communication system.

Additionally, in FIG. 5, reference numeral 21a represents a main line of the CAN communication, and each control circuit board 40 of the respective modules 11 is connected with the main line 21a via a branch line 21b in such a manner that the control circuit board 40 is suspended from the main line 21a. The control circuit board 40 exchanges all kinds of information in units of module with the hybrid ECU 3. In FIG. 5, with respect to the plurality of capacitor modules 11, four modules (MDL1~MDL4) are connected with the min circuit in series or in a row.

Figure 2:
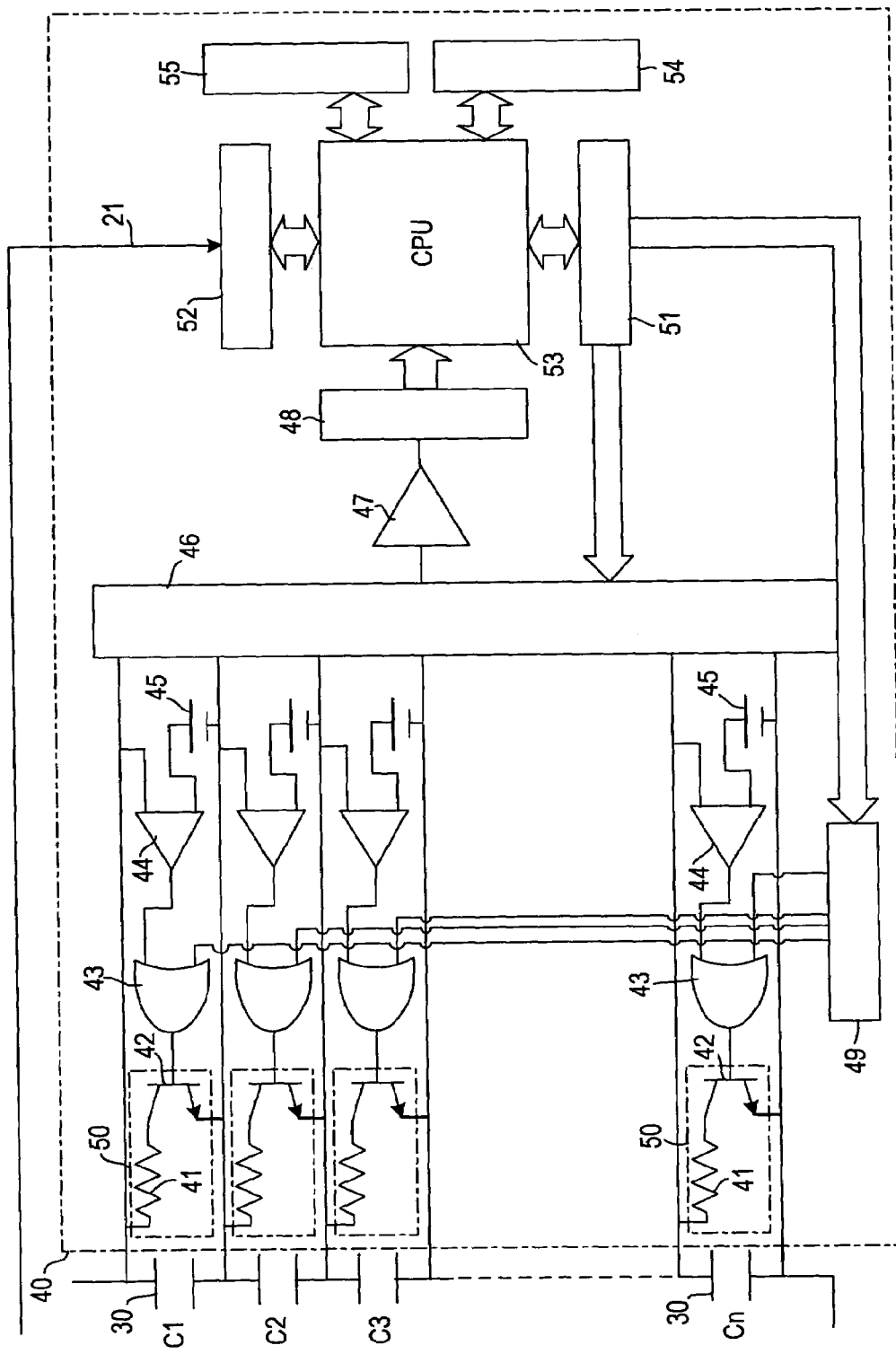
FIG. 2 is a block diagram of a capacitor module similarly.

The control circuit board 40 is constituted as shown in FIG. 2. A bypass circuit 50 is composed of current-limit resistance 41 and a transistor 42, and the bypass circuit 50 is connected with a capacitor cell 30 in a row every capacitor cells which are connected in series (C1~Cn). Based on an output of a comparator 44 and an output of a bypass switching circuit 49, an OR circuit 43 outputs an ON (bypass actuation) signal to the transistor 42 when either of the outputs becomes a high level signal (bypass command). The transistor 42 closes the bypass circuit 50 when base voltage is applied due to an ON signal from the OR circuit 43. On the other hand, the transistor 42 opens the bypass circuit 50 when the application of base voltage is released due to an OFF signal of the OR circuit 43.

The comparator 44 outputs a bypass command for initializing the electricity storage device to maximum voltage. The comparator 44 compares an assigned voltage of the capacitor cell 30 with a threshold voltage which corresponds to the maximum voltage of the electricity storage device 3 and is set by a voltage generator 45. Then the comparator 44 outputs a bypass command to the OR circuit 43 of the capacitor cell 30 in which the assigned voltage exceeds the threshold voltage.

Further, the bypass switching circuit 49 outputs a bypass command to the OR circuit 43 of the capacitor cell 30 (C1~Cn) which requires bypassing in order to modify (equalization) a difference among assigned voltages of the capacitor cell 30.

A voltage detection switching circuit 46 detects the assigned voltages (cell voltages) of the capacitor cell 30 one after another. The detection signal is insulated from a main circuit system power source by an insulation amplifier and is outputted to a CPU 53 via an AD converter 47. The CPU 53 exchanges necessary information with the hybrid ECU 3 via a communication circuit 52. At the same time, while using control data stored in a RAM 54, the CPU 53 carries out bypass processing for equalization (alignment) of assigned voltages in units of cell based on programs stored in a ROM 55 and also controls the execution of the bypass processing for alignment of assigned voltages in units of module in response to a demand of the hybrid ECU 3.

Reference numeral 51 represents an output circuit which outputs a cell switching signal for proceeding the changeover of bypass targets one after another to the bypass switching circuit 49 according to a command from the CPU 53. Similarly, the output circuit outputs a cell switching signal for proceeding detection of voltage one after another to the voltage detection switching circuit 46 according to a command from the CPU 53.

In the CPU 53, assigned voltages of the capacitor cell 30 are read out one after another and a difference $\Delta V$ between a maximum voltage Vmax and a minimum voltage of these assigned voltages is found. When the difference $\Delta V$ (dispersion) becomes a prescribed value Vk or more, the bypass processing for alignment of the assigned voltages in units of cell will be carried out based on the information from the hybrid ECU 3 if the electricity storage device 10 is in a state of being charged, the charging current is at a stipulated value or less, and a module temperature does not exceed a normal range.

Assigned voltages of the capacitor cells 30 (C1~Cn) are summed up, a total voltage Vt of each capacitor module is found, and the total voltage Vt is divided by the number n of the capacitor cells, whereby an average voltage Vmean of the capacitor cells 30 is found. Then, a bypass reference voltage (Va=Vmean+Vk/2) is set based on the average voltage Vmean. A bypass command is outputted to the OR circuit 43 of the capacitor cell 30 in which the assigned voltage is Va or more among from the capacitor cells 30 (C1~Cn).

Because a part of charging currents to be charged to the capacitor cell in which the assigned voltage is Va or more flows through the bypass circuit 50, a difference among the assigned voltage in units of cell is decreased with the progress of charging time.

Information is taken into the hybrid ECU 3 from the capacitor modules 11 (MDL1~MDLm). With respect to each capacitor module 11, the assigned voltages of the capacitor cells 30 are read out and the assigned voltages of each capacitor cell 30 are summed up as a total voltage of each module (module total voltage). By dividing a combined value of the total voltage by the number m of modules, an average voltage in units of module (module average voltage) is found. The average voltage and the total voltage of each module 11 (MDL1~MDLm) are compared and a voltage alignment demand flag=1 is set for the capacitor module 11 which carries a module average voltage or less.

When a state of a vehicle is detected, there is a capacitor module to which a voltage alignment demand flag=1 is set, and the state of the vehicle allows bypass processing, an average voltage Vmean' in units of cell is found from an average voltage in units of module and a bypass reference voltage (Vmean'+Offset) is set based on the average voltage Vmean' in units of cell. Bypass processing with the bypass reference voltage (Vmean'+Offset) is required of the CPU 53 of the capacitor module 11 to which the voltage alignment demand flag=1 is set.

This demand will have priority over bypass processing in units of cell in the CPU 53 unless a module temperature exceeds a normal range. In such a state of a vehicle that charge and discharge do not take place between the electricity storage device 10 and the rotary electric machine (when an inverter current is zero), a part of the storage currents of the capacitor cell 30 in which the assigned voltages exceed the bypass reference voltage (Vmean'+Offset) flows out of the capacitor cell 30 and flows through the bypass circuit 50. Due to conversion into thermal energy, the assigned voltage of the relevant capacitor cell 30 drops. At the time of electric charge with a constant current, a part of the charging currents of the capacitor cell 30 in which the assigned voltages exceed the bypass reference voltage (Vmean'+Offset) flows through the bypass circuit 50. Thus, rise of the assigned voltages of the relevant capacitor cell 30 is restricted and a difference among the assigned voltages in units of module is decreased.

Figure 3:
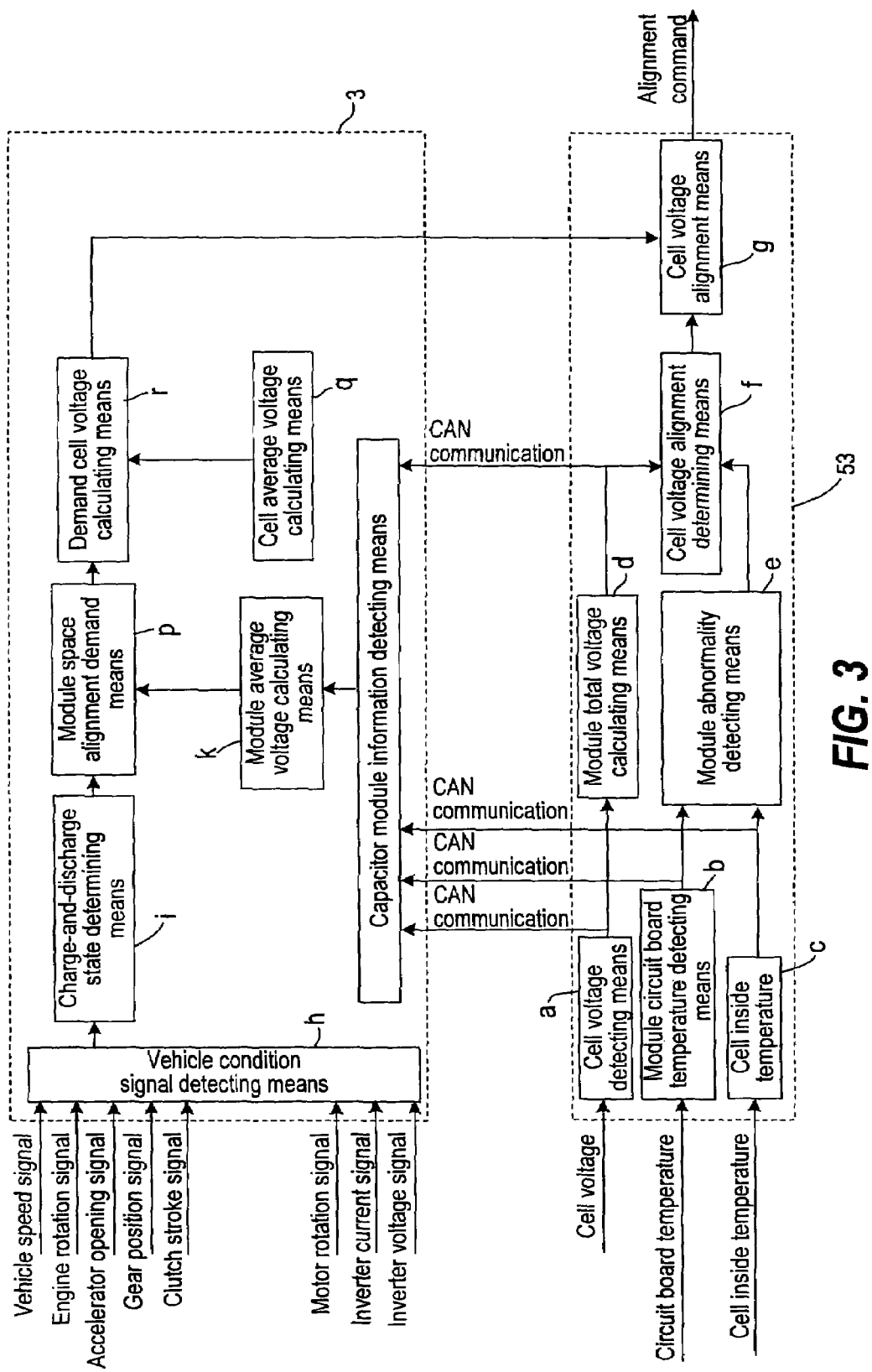
FIG. 3 is a functional block diagram showing bypass processing similarly.

FIG. 3 shows a functional block diagram of the hybrid ECU 3 and the CPU 53 of each capacitor module 11 (module CPU) which relates to bypass processing for alignment of the assigned voltages in units of module.

A means a (cell voltage detecting means) for reading out the assigned voltages (cell voltages) of the capacitor cell 30 one after another, a means b (module circuit board temperature detecting means) for reading out a temperature (detection signal of a temperature sensor not shown in the drawing) of the control circuit board 40 as a module temperature, a means c (cell temperature detecting means) for reading out a temperature (detection signal of the temperature sensor not shown in the drawing) of the capacitor cell 30 similarly, a means d (module total voltage calculating means) for finding a total voltage of the relevant module 11 based on detected data of the cell voltage, a means e (module abnormality detecting means) for determining from detected data of a module temperature (circuit board temperature, cell temperature) whether or not an inner temperature of the relevant module 11 is within a normal range, a cell voltage alignment determining means f, and a cell voltage alignment means g are provided in the module CPU 53.

The cell voltage alignment determining means f determines whether or not the bypass processing is allowed and whether or not the bypass processing is required. When the bypass processing is required and allowed, the cell voltage alignment means g outputs a bypass command to the capacitor cell 30 in which the assigned voltages (cell voltages) exceed the bypass reference voltage in the process of proceeding the bypass processing of the capacitor cell 30 one after another. In case of the bypass processing for alignment of the assigned voltages in units of cell, the bypass reference voltage is set at (Vmean+Vk/2). On the other hand, in case of the bypass processing for alignment of the assigned voltages in units of module, the bypass reference voltage is set at (Vmean+Offset).

The hybrid ECU 3 comprises, a means (h) (vehicle condition signal detecting means) for reading out a detection signal (vehicle speed signal, motor rotation signal, inverter current signal, or the like) of all kinds of sensors, switches, and the like which are not shown in the drawing, a means (i) (charge-and-discharge state determining means) for determining a charge-and-discharge state from these detection data, a means (j) (capacitor module information detecting means) for taking in detection data (cell voltage, circuit board temperature, cell temperature) and information (results of determination of alignment or the like) from the module CPU 53, a module average voltage calculating means (k), a module space alignment demand means (p), a cell average voltage calculating means (q), and a demand cell voltage calculating means (r).

An ID number of each module 11 is attached to detection data or information from the module CPU 53 and the detection data or the information is transmitted to the hybrid ECU 3. In the module average voltage calculating means k, assigned voltages of the capacitor cells 30 are summed up every modules as the total voltages of the capacitor modules 11 and the average voltage in units of module is found by dividing a combined value of the total voltages by the number m of the modules.

When the average voltage in units of module and the total voltage (module total voltage) of each module 11 are compared one after another and the charge-and-discharge state and the module temperature meet the criterion for permitting the capacitor module 11 in which the module total voltage is the module average voltage or less to carry out the bypass processing (a vehicle condition in which charge and discharge do not take place between the electricity storage device 10 and the rotary electric machine and a state of electric charge with a constant current), the module space alignment demand means (p) generates a demand for bypass processing.

The cell average voltage calculating means converts an average voltage in units of module into an average voltage (cell average voltage) in units of cell by dividing the average voltage in units of module by the number n of cells. When the demand cell voltage calculating means receives a demand for bypass processing, the demand cell voltage calculating means calculates a bypass reference voltage (Vmean'+Offset) based on the cell average voltage and transmits to the capacitor module 11 in which the module total voltage is the module average voltage or less.

Figure 4:
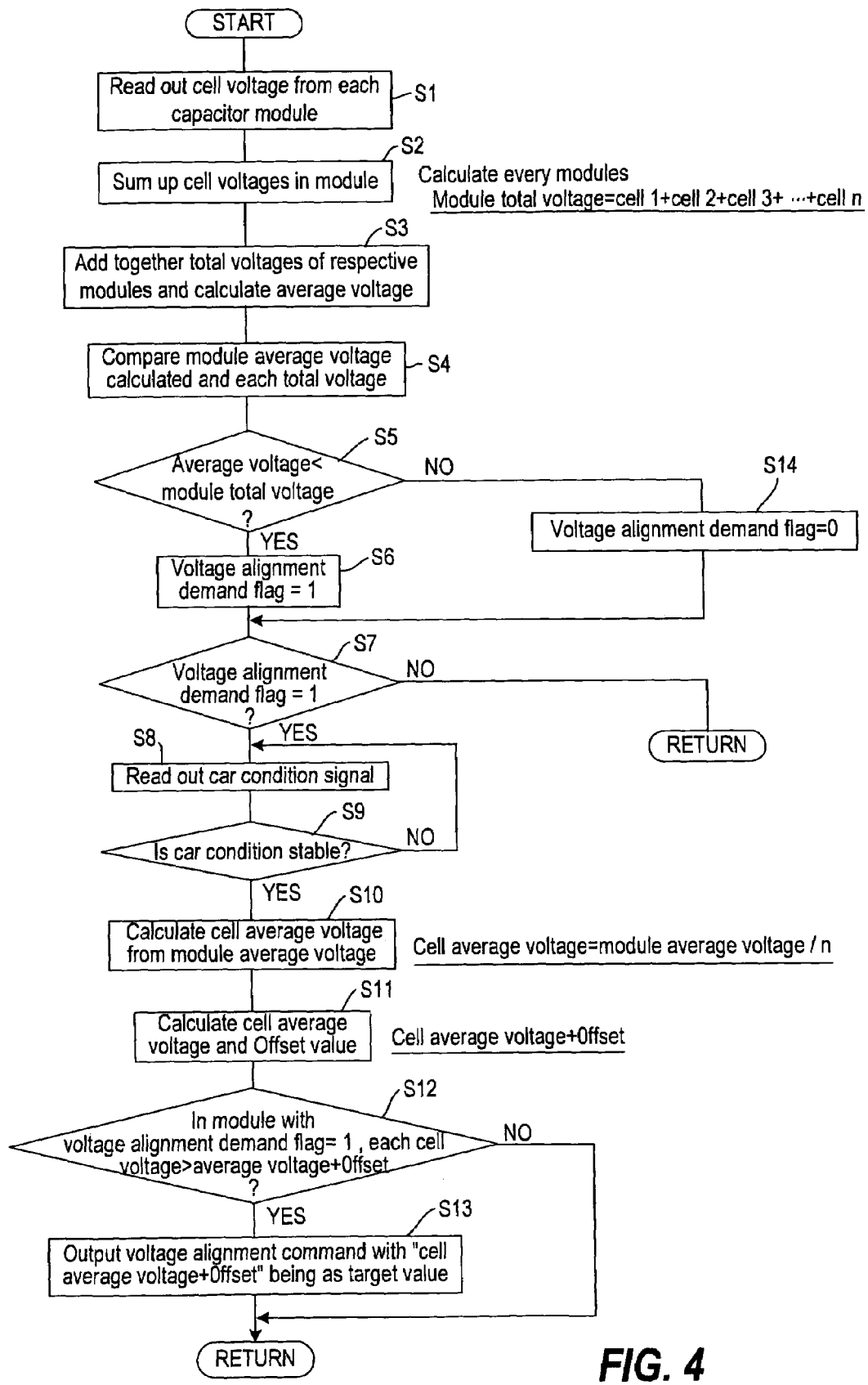
FIG. 4 is a flowchart showing the contents of control by a hybrid ECU similarly.

FIG. 4 is a flowchart showing the contents of control by the hybrid ECU 3 which relate to bypass processing for alignment of the assigned voltages in units of module. At the first step S1, a cell voltage of each capacitor module 11 is read out. At the second step S2, cell voltages are summed up every modules. At the third step S3, total values of the cell voltages in the respective modules 11 are added together and the combined value is divided by the number m of modules so as to find the module average voltage.

At the fourth step S4 and the fifth step S5, the module average voltage and the total value (module total voltage) of the cell voltages every modules 11 are compared and it is determined whether or not the module average voltage is less than the module total voltage. If the determination at S5 is affirmative, at S6 the voltage alignment demand flag=1 will be set to the capacitor module 11 in which the module average voltage is less than the module total voltage. On the other hand, if the determination at S5 is negative, the voltage alignment demand flag=0 will be set to the capacitor module 11 in which the module average voltage is equal to or greater than the module total voltage at the fourteenth step S14.

At the seventh step S7, it is determined whether or not there is any capacitor modules 11 to which the voltage alignment demand flag=1 is set. If the determination at S7 is affirmative, the step will advance to the eighth step S8. On the other hand, if the determination at S7 is negative, the step will escape to RETURN. At eighth step S8 and ninth step S9, a vehicle condition signal is read out and it is determined whether or not the vehicle condition (charge-and-discharge state) including the module temperature is in a stable condition which meets a criterion for permitting the bypass processing. If the determination at S9 is negative, the step will return to S8. On the other hand, if the determination at S9 is affirmative, the step will advance to the tenth step S10.

At S10, "cell average voltage=module average voltage/number of cells" is calculated from the module average voltage. At the eleventh step S11, the bypass reference voltage (Va=Vmean'+Offset) for alignment of the assigned voltages in units of module is calculated. At the twelfth step S12, it is determined whether or not there are any capacitor cells 30 in which the cell voltage is greater than the bypass reference voltage in the capacitor module 11 to which the voltage alignment demand flag=1 is set. If the determination at S12 is negative, the step will escape to RETURN. On the other hand, if the determination at S12 is affirmative, the capacitor module 11 to which the voltage alignment demand flag=1 is set will be demanded to output a bypass command to the capacitor cell 30 in which the cell voltage is greater than (Vmean'+Offset) at the thirteenth step S13.

Based on such constitution, a difference among the assigned voltages in units of module is favorably modified due to the bypass processing for alignment of the assigned voltages in units of module. Thus, also in an exchange of modules, alignment of the assigned voltages in units of module between a new product and an existing product is efficiently performed.

In this embodiment, by jointly using the bypass processing for alignment of the assigned voltages in units of module and the bypass processing for alignment of the assigned voltages in units of cell, it is possible to accurately align the assigned voltages of the capacitor cells 30 in the entire power source. Thus, when the maximum voltage (corresponds to the threshold voltage of a generator) of the electricity storage device 10 is set, it is possible to reduce a margin to be added in consideration of a difference among the assigned voltages in units of cell and a difference among the assigned voltages in units of module, and therefore the capacity of the electricity storage device 10 can fully be utilized.

The present invention is not restricted to the embodiment described above and includes various improvement and modification which can be made by a person skilled in the art based on the contents given in the claims.

INDUSTRIAL APPLICABILITY

The electricity storage controller for vehicles according to the present invention can be applied for a vehicle having a motor as a prime bar, such as a truck and a car.

The invention claimed is:

1. An electricity storage controller for a vehicle comprising:
    a rotary electric machine serving as a prime mover of the vehicle;
    an electricity storage device serving as a main power source of the rotary electric machine and including a power storage module which contains plural storage cells that are connected in series;
    means for determining assigned voltages of the storage cells;
    means for calculating an average value of the assigned voltages; and
    means for equalizing the assigned voltages the storage cells based on the average value, the means for equalizing including:
        a plurality of bypass circuits, which are normally open, and which are connected in parallel with respective ones of the storage cells;
        means for setting a bypass reference voltage based on the average value of the assigned voltages of the storage cells; and
        means for closing the bypass circuits of the storage cells if their assigned voltage exceeds the bypass reference voltage.

2. An electricity storage controller for a vehicle according to claim 1, further comprising means for determining whether or not vehicle conditions allow closing of the bypass circuits, and wherein the bypass circuits can be closed only when the determination means makes an affirmative determination.

3. An electricity storage controller for a vehicle according to claim 2, wherein the determination means does not allow an affirmative determination when a temperature of the storage module is outside a normal range.

4. An electricity storage controller for a vehicle according to claim 2, wherein the vehicle include an inverter between the rotary electric machine and the electricity storage device, and wherein the determination means does not allow an affirmative determination when an inverter current of the inverter is greater than a stipulated value.

5. An electricity storage controller for a vehicle according to claim 1, wherein each bypass circuit comprises a resistance and a bypass transistor.

6. An electricity storage controller for a vehicle according to claim 1, wherein the means for calculating assigned voltages comprises means for detecting the cell voltage of each storage cell and means for summing up the detected values.

7. An electricity storage controller for vehicles according to claim 6, further comprising at least one additional power storage module, and wherein the means for calculating an average value comprises means for summing up a total voltage of the modules and means for dividing the total value by the number of modules.

8. An electricity storage controller for a vehicle according to claim 1, further comprising at least one additional power storage module, and wherein the means for calculating an average value comprises means for dividing an average value of assigned voltages of the capacitor modules by the number of modules.

9. An electricity storage controller for vehicles according to claim 1, wherein the power storage module is a capacitor module and the storage cells are capacitor cells.

* * * * *